United States Patent
Vernyi et al.

(10) Patent No.: US 9,429,498 B2
(45) Date of Patent: Aug. 30, 2016

(54) TIRE TESTING MACHINE

(71) Applicant: KOBELCO STEWART BOLLING, INC., Hudson, OH (US)

(72) Inventors: Dale A. Vernyi, North Canton, OH (US); Glen R. Thompson, Cuyahoga Falls, OH (US)

(73) Assignee: Kobe Steel, Ltd. (JP)

( * ) Notice: Subject to any disclaimer, the term of this patent is extended or adjusted under 35 U.S.C. 154(b) by 173 days.

(21) Appl. No.: 14/214,833

(22) Filed: Mar. 15, 2014

(65) Prior Publication Data

US 2014/0260583 A1 Sep. 18, 2014

Related U.S. Application Data

(63) Continuation of application No. 61/794,567, filed on Mar. 15, 2013.

(51) Int. Cl.
*G01M 17/02* (2006.01)

(52) U.S. Cl.
CPC .................................. *G01M 17/021* (2013.01)

(58) Field of Classification Search
USPC .......................................................... 73/146
See application file for complete search history.

(56) References Cited

U.S. PATENT DOCUMENTS

| | | |
|---|---|---|
| 4,008,396 A | 2/1977 | Loyer |
| 5,992,227 A | 11/1999 | Jellison et al. |

(Continued)

FOREIGN PATENT DOCUMENTS

| | | |
|---|---|---|
| JP | 2012-127794 | 7/2012 |
| JP | 2012-220319 | 11/2012 |

(Continued)

OTHER PUBLICATIONS

International Search Report mailed Jul. 29, 2014 for International Application No. PCT/US2014/029991.

(Continued)

*Primary Examiner* — Lisa Caputo
*Assistant Examiner* — Jamel Williams
(74) *Attorney, Agent, or Firm* — Fay Sharpe LLP

(57) ABSTRACT

A tire uniformity testing machine includes an upper spindle including an upper rim portion, a lower spindle including a lower rim portion, and a spindle actuator such as a servo actuator adapted to vary a distance between the upper and lower spindles along a y axis. The tire testing machine also includes a conveyor adapted to move an associated tire to be tested along an x axis in a conveying direction. The conveyor is driven by a conveyor actuator said as a servo actuator. A motion controller is provided and receives x axis position feedback indicating a conveying distance moved by the conveyor along said x axis and that uses the x axis position feedback to control the spindle actuator to vary the distance between the upper and lower spindles along the y axis according to a function $y=F(x)$ for coordinated synchronous variation of the distance between the upper and lower spindles along the y axis in response to movement of the conveyor along the x axis. The conveyor also moves vertically along the y axis and its position along with y axis can also be controlled by a servo actuator for coordinated vertical movement as a function of said x axis position feedback and/or as a function of y axis position feedback provided by said spindle actuator indicating a distance between said lower and upper spindles.

18 Claims, 15 Drawing Sheets

(56) References Cited

U.S. PATENT DOCUMENTS

| | | | |
|---|---|---|---|
| 6,016,695 A | 1/2000 | Reynolds et al. | |
| 6,082,191 A | 7/2000 | Neiferd et al. | |
| 7,240,543 B2 | 7/2007 | Cargould et al. | |
| 2006/0016258 A1* | 1/2006 | Williams | G01M 1/045 73/462 |
| 2011/0066291 A1* | 3/2011 | Morita | G05B 19/19 700/279 |
| 2011/0203362 A1* | 8/2011 | Imamura | G01M 17/021 73/146 |
| 2013/0233066 A1 | 9/2013 | Wakazono et al. | |
| 2013/0333615 A1 | 12/2013 | Wakazono et al. | |
| 2013/0334754 A1 | 12/2013 | Wakazono et al. | |
| 2014/0090461 A1* | 4/2014 | Cuttino | G01M 17/021 73/118.01 |

FOREIGN PATENT DOCUMENTS

| | | | |
|---|---|---|---|
| JP | 5284340 | 6/2013 | |
| WO | WO 2012/081226 A1 | 6/2012 | |
| WO | WO 2012081226 A1 * | 6/2012 | .......... G01M 17/021 |
| WO | WO 2012/137416 A1 | 10/2012 | |

OTHER PUBLICATIONS

Written Opinion mailed Jul. 29, 2014 for International Application No. PCT/US2014/029991.

International Preliminary Report on Patentability issued Sep. 15, 2015 for International Application No. PCT/US2014/029991.

* cited by examiner

TIRE TESTING MACHINE

CROSS-REFERENCE TO RELATED APPLICATION

This application claims priority from and benefit of the filing date of U.S. provisional application Ser. No. 61/794,567 filed Mar. 15, 2013, and the entire disclosure of said provisional application is hereby expressly incorporated by reference into the present specification.

FIELD

The present development relates to a tire testing machine that tests a tire conveyed by a tire testing machine conveyor.

BACKGROUND

When a tire attached to an automobile or the like includes a portion that has a non-uniform dimensional shape or a non-uniform elastic modulus in the circumferential direction, such portion causes a vibration during a high-speed rotation, and degrades the running performance of the automobile or the like. For this reason, the tire is subjected to a circumferential uniformity test by a tire testing machine after a vulcanizing process. The tire testing machine performs a test in a manner such that a bead portion of the inner periphery of the tire is fitted or "chucked" onto separate first/lower and second/upper rim members provided on respective first/lower and second/upper spindles or chuck assemblies, the tire is inflated to a predetermined inner air pressure, and the tire is rotationally driven while the outer periphery of the tire is pressed against a road surface simulation member such as a rotating drum. In general, lubricant is applied to the bead portion of the tire to be tested in order to smoothly fit the tire onto the rim members. In such tire testing machines, it is known to convey a tire to be tested to a center or testing position where it is chucked as described above for the testing operation.

In one known machine, a front end of a tire on a conveyor and a rear end of the tire are detected by sensors respectively provided at predetermined positions, and the tire to be tested is conveyed to the center position of the spindle, and a conveying distance from the predetermined position at the entrance side of the test station is calculated based on the calculated outer diameter of the tire.

Further, in another known tire testing machine, a tire is centered and conveyed a predetermined distance, to where the tire matches a rotation axis of a spindle assembly, using the conveyor. Then, when the tire is located in the testing position, the conveyor is caused to descend downward in relation to the spindle assembly, and the tire chucking operation is performed by the spindle assembly.

In these known systems, the tire chucking operation is not initiated until the tire is located in the testing position with respect to the conveying direction and, for this reason, the tire test time (i.e., the cycle time) in known tire testing machines is negatively lengthened. Meanwhile, when the chucking mechanism that drives one or both spindles including the upper and lower rim members is operated with excessive acceleration speed or an excessive deceleration speed in order to shorten the cycle time, a problem arises in that the actuator(s) increase in size and cost and component wear increases. Further, when the speed of the tire testing machine conveyor, itself, increases, a problem arises in that the tire may slip relative to the conveyor and not be conveyed as intended or expected on the conveyor.

SUMMARY OF THE INVENTION

In accordance with a first aspect of the present development, a tire testing machine includes an upper spindle including an upper rim portion, a lower spindle including a lower rim portion, and a spindle actuator adapted to vary a distance between the upper and lower spindles along a y axis. The tire testing machine also includes a conveyor adapted to move an associated tire to be tested along an x axis. The conveyor is driven by a conveyor actuator. A motion controller is provided and receives x axis position feedback indicating a conveying distance moved by the conveyor along said x axis and that uses the x axis position feedback to control the spindle actuator to vary the distance between the upper and lower spindles along the y axis according to a function y=F(x) for coordinated synchronous variation of the distance between the upper and lower spindles along the y axis in response to movement of the conveyor along the x axis.

DETAILED DESCRIPTION

One or more embodiments of a tire testing machine provided in accordance with the present development are described below with reference to the drawings. It is not intended that the present development be limited to the particular embodiment(s) disclosed herein, and a tire testing machine according to the present development may be modified into various forms in accordance with the claims.

Figure 1:
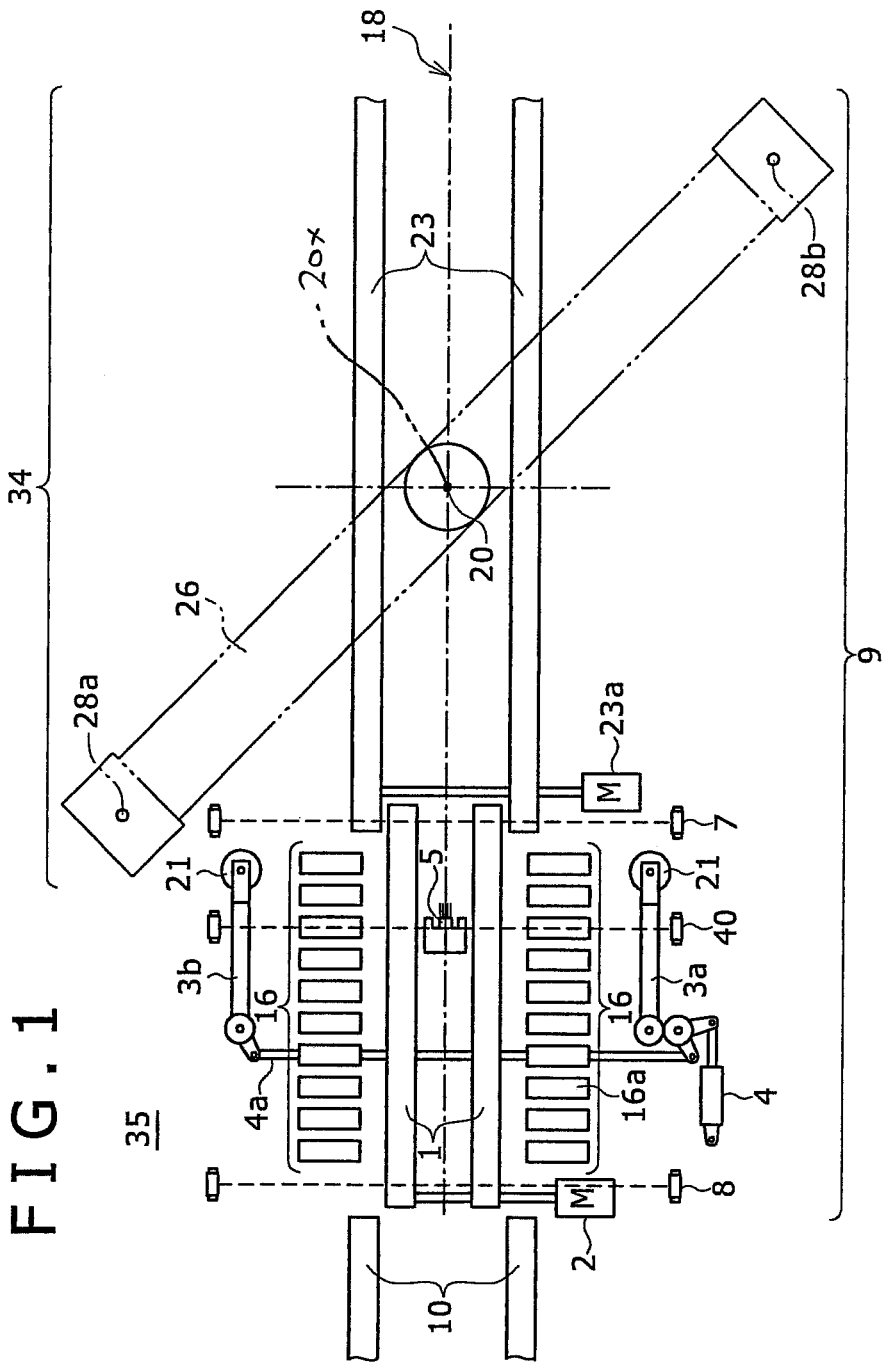
FIG. 1 is a top view illustrating a tire testing machine according to the present development.
Figure 2:
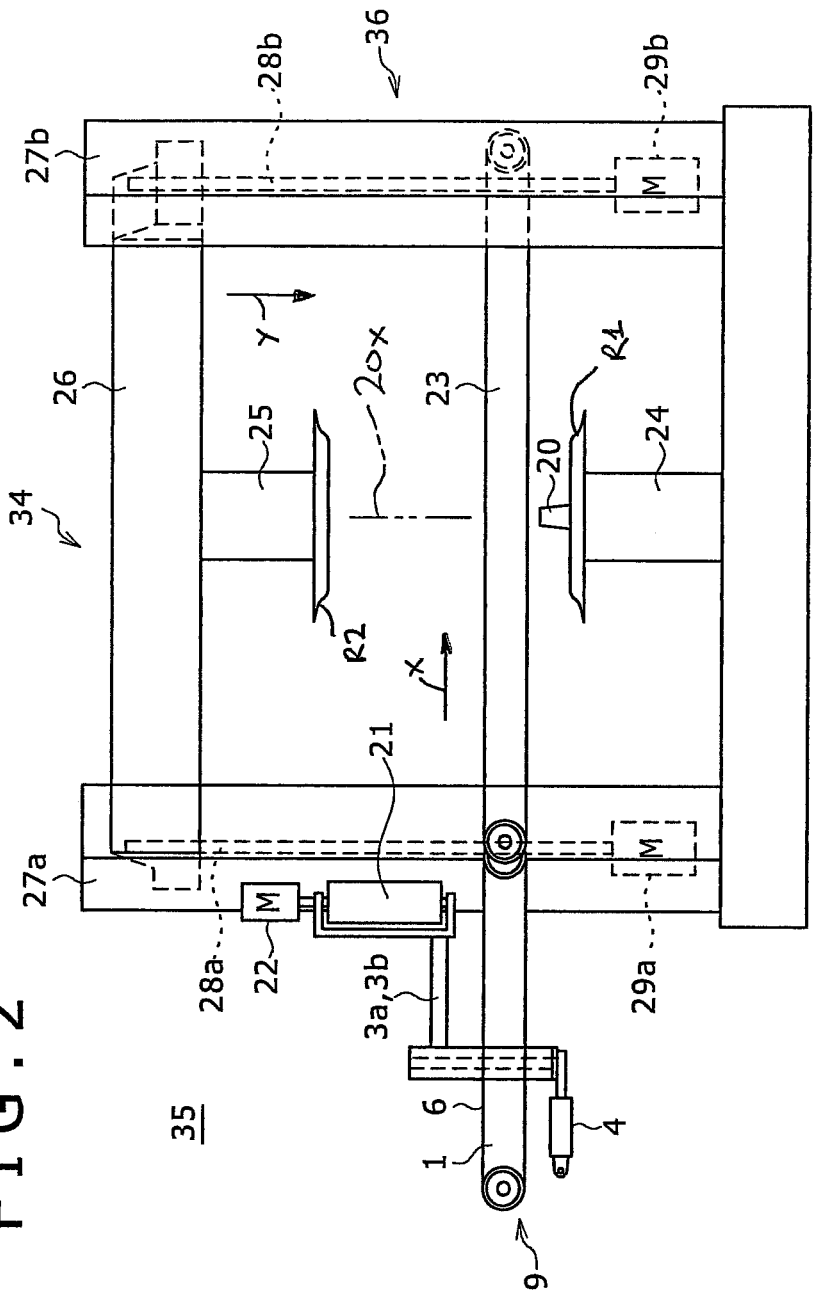
FIG. 2 is a side view of the tire testing machine of FIG. 1.
Figure 3:
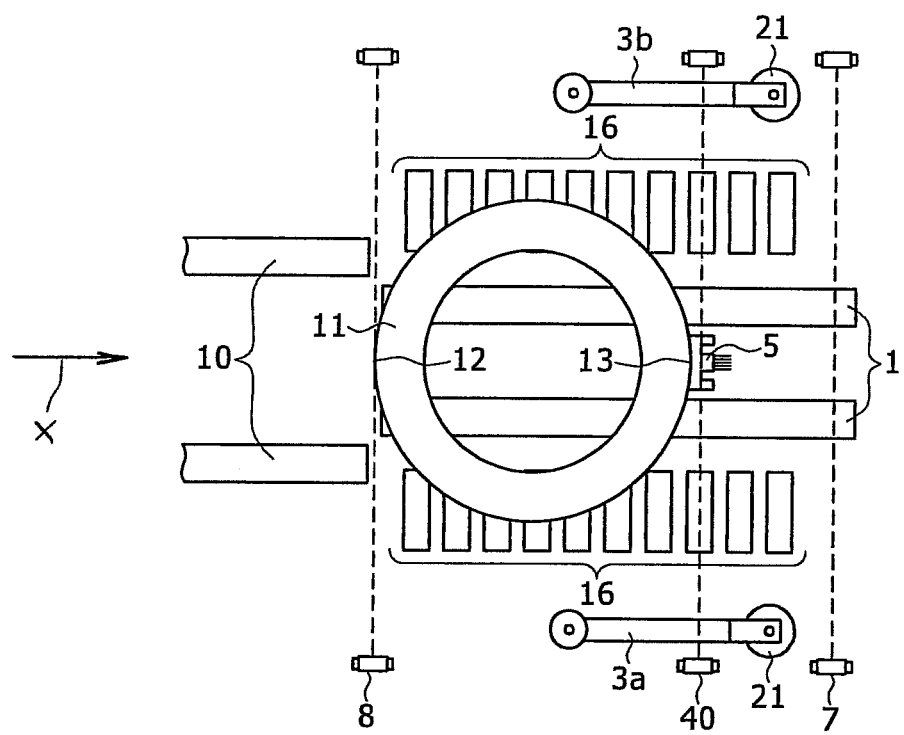
FIG. 3 is a top view illustrating only the entrance conveyor portion of the tire testing machine of FIG. 1, and shows an associated tire being conveyed located at an upstream end of the entrance conveyor.

As illustrated in FIGS. 1 to 3, a tire testing machine conveyor 9 that is used in a tire testing machine 35 according to the present development includes an entrance conveyor 1 comprising a first belt conveyor that conveys an associated tire 11 that is to be tested from an upstream supply conveyor 10 to a main or center conveyor 23 comprising a second belt conveyor that is located adjacent and/or connected to the downstream side of the entrance conveyor 1 and extends into a test station 34. In the example illustrated in the drawings, each of the entrance conveyor 1 and the center conveyor 23 includes a pair of conveying belts so that the conveying surface is divided into two conveying portions provided by the respective conveying belts. The entrance conveyor 1 and center conveyor 23 can alternatively be combined into a single conveyor.

An input shaft of the entrance conveyor 1 is connected to an entrance conveyor servo motor 2 (FIG. 1), and the entrance conveyor 1 is be driven by the rotation of the entrance conveyor servo motor 2. The upstream side of the entrance conveyor 1 is connected with and/or located adjacent the supply conveyor 10 that supplies the associated tires 11 to be tested. In the illustrated embodiment, the entrance conveyor 1 comprises a first or upstream photoelectric or other sensor 8 (FIG. 3) that detects a rear or upstream end 12 of the tire 11 conveyed in the downstream conveying direction x. Further, the downstream side of the entrance conveyor 1 is provided with a second or downstream photoelectric or other sensor 7 that detects a front or downstream end 13 of the tire 11 conveyed toward the center conveyor 23. Slightly upstream from the photoelectric sensor 7, the entrance conveyor optionally comprises a third or intermediate photoelectric sensor 40 that also detects the front end 13 of the tire 11 conveyed toward the center conveyor 23.

The center conveyor 23 sends the associated tire 11 received from the entrance conveyor 1 toward the testing position. The testing position is defined as the position where the tire 11 is centered for rotation about an axis of rotation 20x such as that defined by a spindle plunger or core 20 of a first or lower spindle 24. An input shaft of the center conveyor 23 is connected to a center conveyor servo motor 23a (FIG. 1), and the center conveyor 23 is be driven by the rotation of the center conveyor servo motor 23a. Furthermore, the center conveyor 23 includes a center conveyor elevation mechanism 23c (see FIG. 15) such as one or more pneumatic or hydraulic cylinders including position sensors that detect and output the vertical position of the center conveyor 23 directly or indirectly, or the center conveyor elevation mechanism 23c is alternatively provided by at least one servo actuator that provides direct elevational feedback as to the vertical position of the center conveyor 23 such as a servo motor connected to a ball screw (screw jack) or another servo actuator. The center conveyor elevation mechanism 23c lowers and raises the center conveyor 23 in a direction y perpendicular to the conveying direction x.

Figure 4:
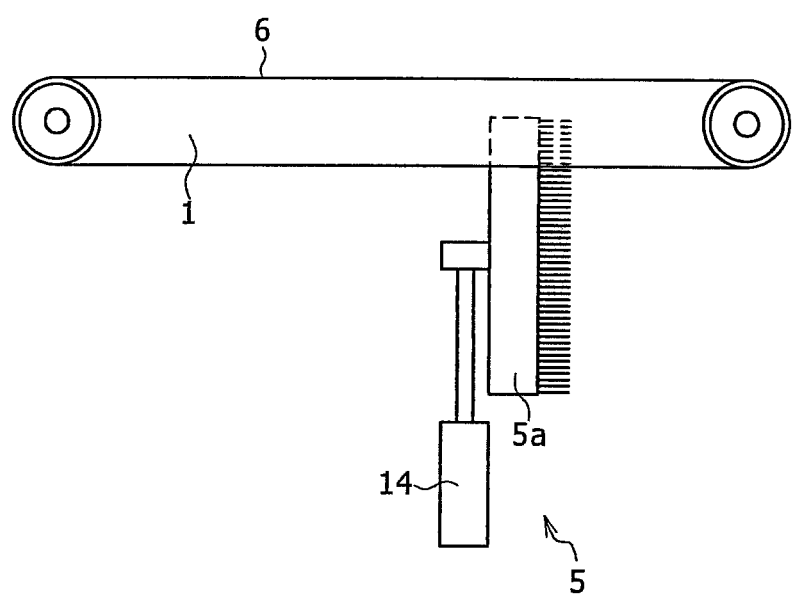
FIG. 4 is a side view illustrating the entrance conveyor portion of FIG. 3 and a lubricator portion thereof located in a home or inactive position.
Figure 5:
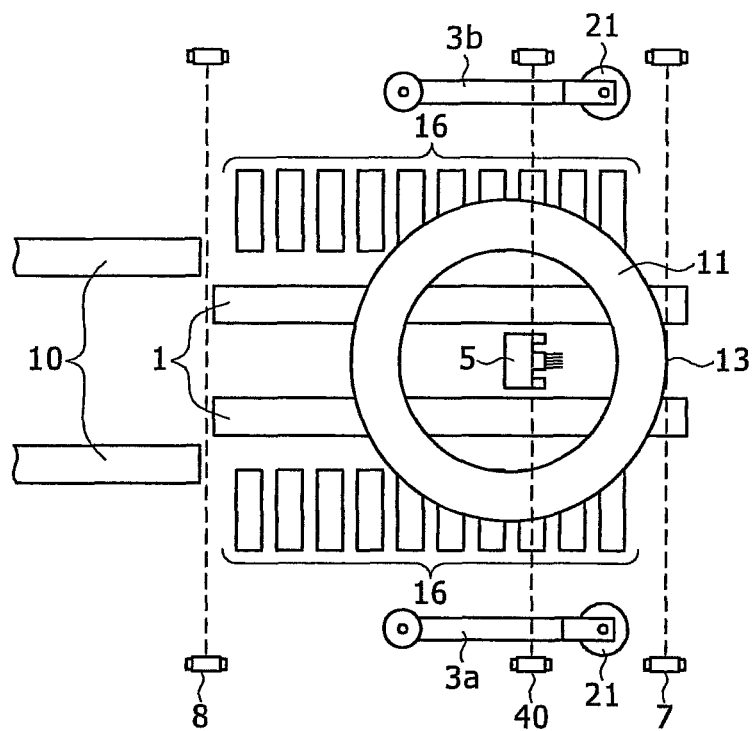
FIG. 5 is a top view illustrating the entrance conveyor of FIG. 3, with the associated tire located at a downstream end of the entrance conveyor.
Figure 6:
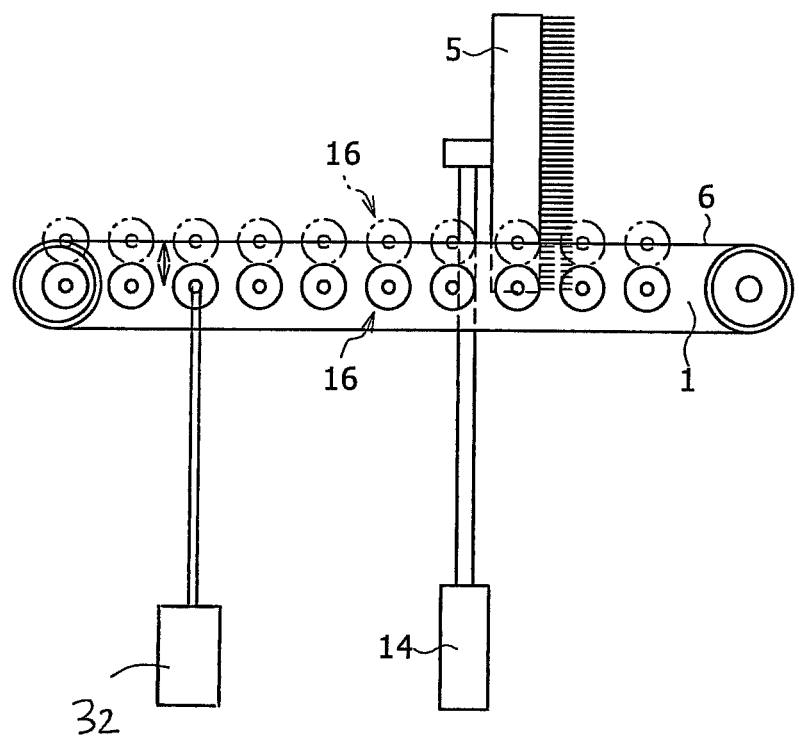
FIG. 6 is a side view of the entrance conveyor showing the lubricator in an extended or active position.

Referring also now to FIGS. 4-6, a lubricator 5 that is selectively elevated by an air cylinder 14 or other actuator is provided between the pair of conveying belts of the entrance conveyor 1. As will be described later, the lubricator 5 includes a brush 5a that applies lubricant to a bead portion 15 of the inner periphery of the tire 11.

The opposite lateral sides of the entrance conveyor 1 in the width direction are provided with a pair of arm members 3a and 3b formed so that the front end thereof faces the downstream direction. A pressing roller 21 that presses the outer peripheral surface of the rotating tire 11 toward the center side is attached to each of the pair of arm members 3a and 3b, and the arm members rotate inward and outward in the width direction by a link mechanism 4a and an air cylinder 4 or other actuator in a bilaterally symmetrical state. As illustrated in FIG. 2, the one or more pressing rollers 21 that attached to the front ends of the pair of arm members 3a,3b are rotationally driven by a motor 22.

One or more roller portions or roller surfaces 16 are located adjacent the pair of conveying belts of the entrance conveyor 1. Each roller surface 16 includes a plurality of rollers 16a that rotate about multiple axes of rotation in order to support the tire for sliding movement in any direction and for rotation in a horizontal plane about a vertical axis of rotation. In the illustrated embodiment, the roller surfaces 16 are provided with an elevation mechanism 32 (FIG. 6) such as an air cylinder or the like such that a tire conveyed on the entrance conveyor 1 can be selectively supported on the conveying belts of the entrance conveyor or, alternatively, on the elevated roller surfaces 16 as required to allow rotation of the tire on the roller surfaces 16.

As illustrated in FIGS. 1 and 2, the tire testing machine 35 includes a test station or test table 34 including a lower chuck assembly or lower spindle 24 and an upper chuck assembly or upper spindle 25. Further, the test station 34 is provided with a chucking mechanism 36 that includes a vertically movable slide beam 26, guide frames 27a and 27b, screw jacks or ball screws 28a and 28b, and the first and second upper spindle motors or other actuators 29a and 29b which are used to chuck the tire 11 in a manner such that the lower spindle 24 and the upper spindle 25 are positioned with the testing tire 11 operatively interposed between the lower spindle 24 and the upper spindle 25. The upper spindle 25 is attached to the slide beam 26. The slide beam 26 is bridged between and movable relative to the two guide frames 27a,27b, and the first and second ball screws 28a,28b are attached respectively to the first and second guide frames 27a,27b. The first and second spindle actuators 29a,29b are respectively attached to the ball screws 28a and 28b, and the slide beam 26 is moved up and down when the ball screws 28a and 28b are respectively driven in a synchronized state by the motors or other actuators 29a,29b. Here, the actuators 29a,29b may be, for example, electric servo motors, but other hydraulic, electric, pneumatic or other actuators with position feedback can alternatively be used. Further, the lower spindle 24 includes a spindle plunger or core 20 that defines the axis of rotation 20x for the tire to be tested. The lower chuck assembly/spindle 24 includes a lower rotatable rim or rim portion R1 that rotates about the vertical axis of rotation 20x,and the upper chuck assembly/spindle 25 includes an upper rotatable rim or rim portion R2 that rotates about the vertical axis of rotation 20x. The tire 11 to be tested also includes a central axis of rotation 17 (see FIG. 7). When the tire 11 is positioned such that the axis of rotation 17 of the tire is coincident with the axis of rotation 20x defined by the spindle core 20, the tire 11 is deemed to be in the test or testing position insofar as the x axis is concerned and the tire 11 is then interposed between the lower rim portion R1 of the lower spindle 24 and the upper rim portion R2 of the upper spindle 25 in a manner such that the ball screws 28a and 28b are driven so as to move the slide beam 26 down, thereby completing the conveying of the tire 11 to the test station 34. As described below, when the tire 11 is in the test position, it is engaged by the lower and upper rim portions R1,R2 (i.e., "chucked"), inflated, and rotatably tested.

Hereinafter, a sequence will be described by referring to FIGS. 3 to 10 in which the tire 11 conveyed from the customer-side conveyor 10 is conveyed to the test station 34 by the tire testing machine conveyor 9 and the tire 11 is interposed between the rim portion R2 of the lower spindle 24 and the rim portion R1 of the upper spindle 25 by the chucking mechanism 36 in the tire testing machine 35 according to this embodiment.

As illustrated in FIG. 4, the lubricator 5 descends downward in relation to the conveying surface 6 of the entrance conveyor 1 when the tire 11 is input from the customer-side conveyor 10 to the entrance conveyor 1. The descending operation of the lubricator 5 is performed by the air cylinder 14. The roller surface of the roller portion 16 is located below the conveying surface 6 of the entrance conveyor 1 as indicated by the solid line of FIG. 6. Further, as illustrated in FIG. 3, the pair of arm members 3a and 3b is rotated outward in the width direction by the air cylinder 4 (FIG. 1) so as to be opened, and hence a space for conveying the tire 11 is ensured on the conveying surface 6 of the entrance conveyor 1.

Then, as illustrated in FIG. 3, the belt conveyor servo motor 2 (FIG. 1) is activated so as to drive the entrance conveyor 1, and the tire 11 that is input from the customer-side conveyor 10 to the entrance conveyor 1 is thus conveyed along the conveying direction x on the entrance conveyor 1.

When the tire 11 is conveyed on the entrance conveyor 1 along the conveying direction x and the front end 13 of the tire outer diameter closest to the test station 34 is detected by the second or downstream photoelectric sensor 7 as illustrated in FIG. 5, the rotation of the entrance conveyor servo motor 2 is stopped so that the operation of conveying the tire 11 using the entrance conveyor 1 is stopped and the tire 11 is located at a known position on the x axis. If the outside diameter OD of the tire 11 is not already known and stored, the outside diameter OD of the tire is detected and/or calculated or derived based upon the movement of the tire 11 along the x axis relative to one or more of the sensors 7,8,40 in relation to the distance the tire 11 is conveyed as known by position feedback from the entrance conveyor servo actuator 2.

Figure 7:
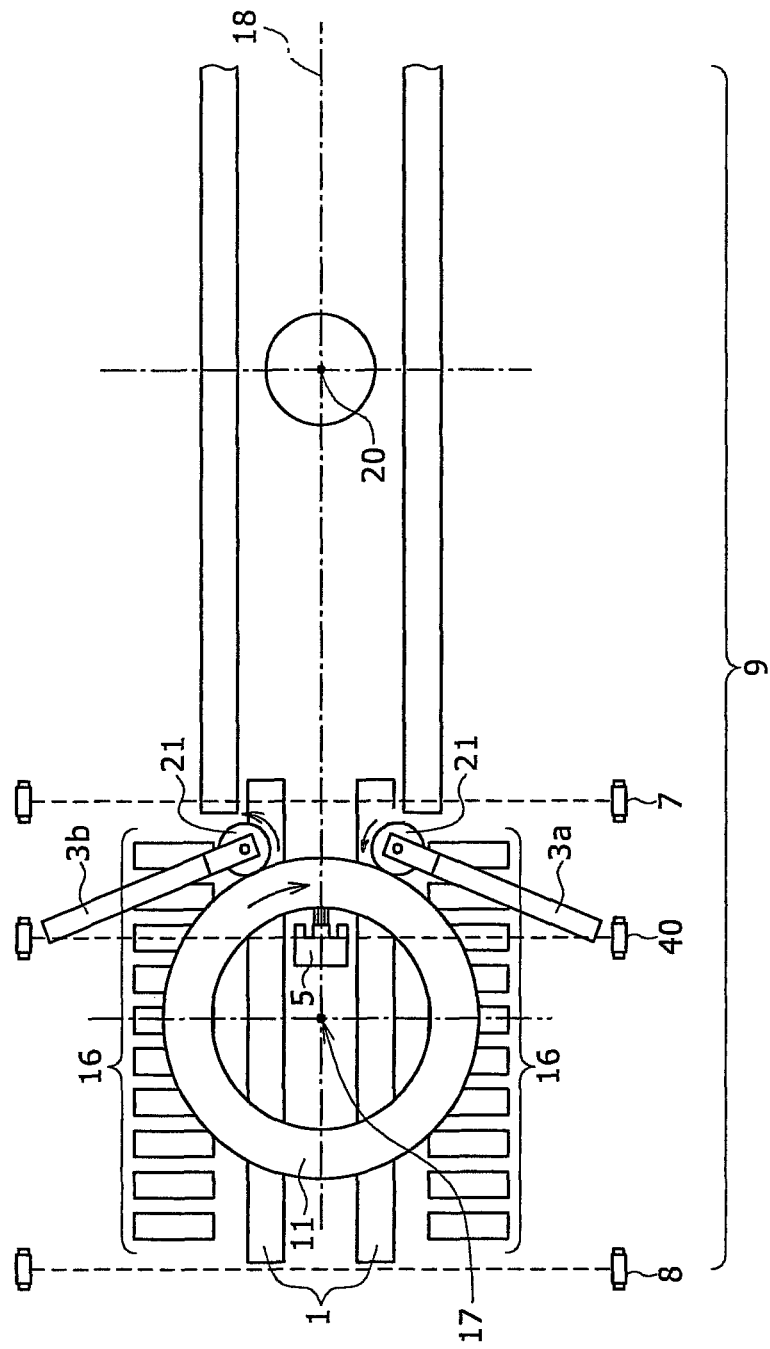
FIG. 7 is a top view of the tire testing machine of FIG. 1, illustrating a state in which the lubricator applies lubricant to a bead portion of the associated tire.
Figure 8:
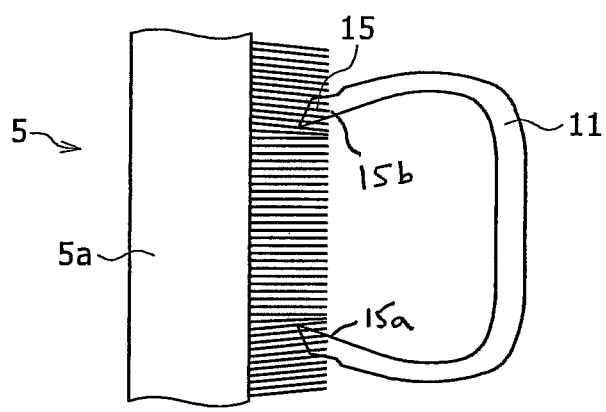
FIG. 8 is an enlarged cross-sectional view illustrating a brush of the lubricator as it applies lubricant to a bead portion of the associated tire.

Referring to FIG. 6, when the inside diameter of the tire is aligned with the lubricator 5, the air cylinder 14 is operated so that the lubricator 5 ascends so as to protrude from the conveying surface 6 of the entrance conveyor 1 within the inside diameter of the tire 11. As noted, operation of the entrance conveyor 1 is stopped by the detection of the tire front end 13 using the downstream photoelectric sensor 7, at which time the rollers 16 are elevated by the actuator 32 as shown in phantom lines in FIG. 6 and, as shown in FIG. 7, the pair of arm members 3a and 3b are operably positioned to press the tire 11 upstream (in the direction opposite the conveying direction x) so that the bead or bead portion 15 of the tire 11 contacts the lubricator 5 as shown in FIG. 8. Alternatively, the entrance conveyor 1 may be back driven before the rollers 16 are elevated and before operation of the arm members 3a and 3b so that the tire 11 is moved slightly upstream by the entrance conveyor so that the tire 11 may be pressed back toward the lubricator 5 at the arm members 3a and 3b.

As noted and as indicated by the phantom lines of FIG. 6, the elevation mechanism 32 is selectively operated so that the roller surface of the roller portion 16 is caused to ascend in relation to the conveying surface 6 of the entrance conveyor 1 and hence the tire 11 is transferred from the belts of the entrance conveyor 1 to the roller portion 16. That is, the upper end of each placement roller of the roller portion 16 is caused to ascend above the conveying surface 6 of the entrance conveyor 1 so that the tire 11 is transferred from the conveying surface 6 of the entrance conveyor 1 to the upper end of each placement roller 16a of the roller portion 16.

Once the tire 11 is supported on the roller portion 16, the air cylinder 4 is driven so that the pair of arm members 3a and 3b is rotated inward in the width direction so as to be closed, and the pair of arm members 3a and 3b presses the tire 11 placed on the roller surface 16 in the upstream direction by the respective pressing rollers 21 thereof. Then, as illustrated in FIGS. 7 and 8, the front 13 of the tire 11 is urged toward lubricator 5 while being pressed by the pair of arm members 3a and 3b on the roller portion 16, and the tire the bead portion 15 (the inner periphery of the tire 11 illustrated in FIG. 8) contacts the lubricator 5.

When the outer periphery or outside diameter of the tire 11 is engaged by the rollers 21 as described, at least one of the rollers 21 is rotationally driven by the motor 22 (FIG. 2). Accordingly, the tire 11 on the roller surface 16 rotates in a horizontal plane on the roller surface 16, and the brush, sponge, roller and/or or other working part of the lubricator 5 applies lubricant to the full circumference of the bead portion 15 of the tire 11 (both the lower bead 15a and upper bead 15b thereof) as illustrated in FIG. 8.

Figure 9:
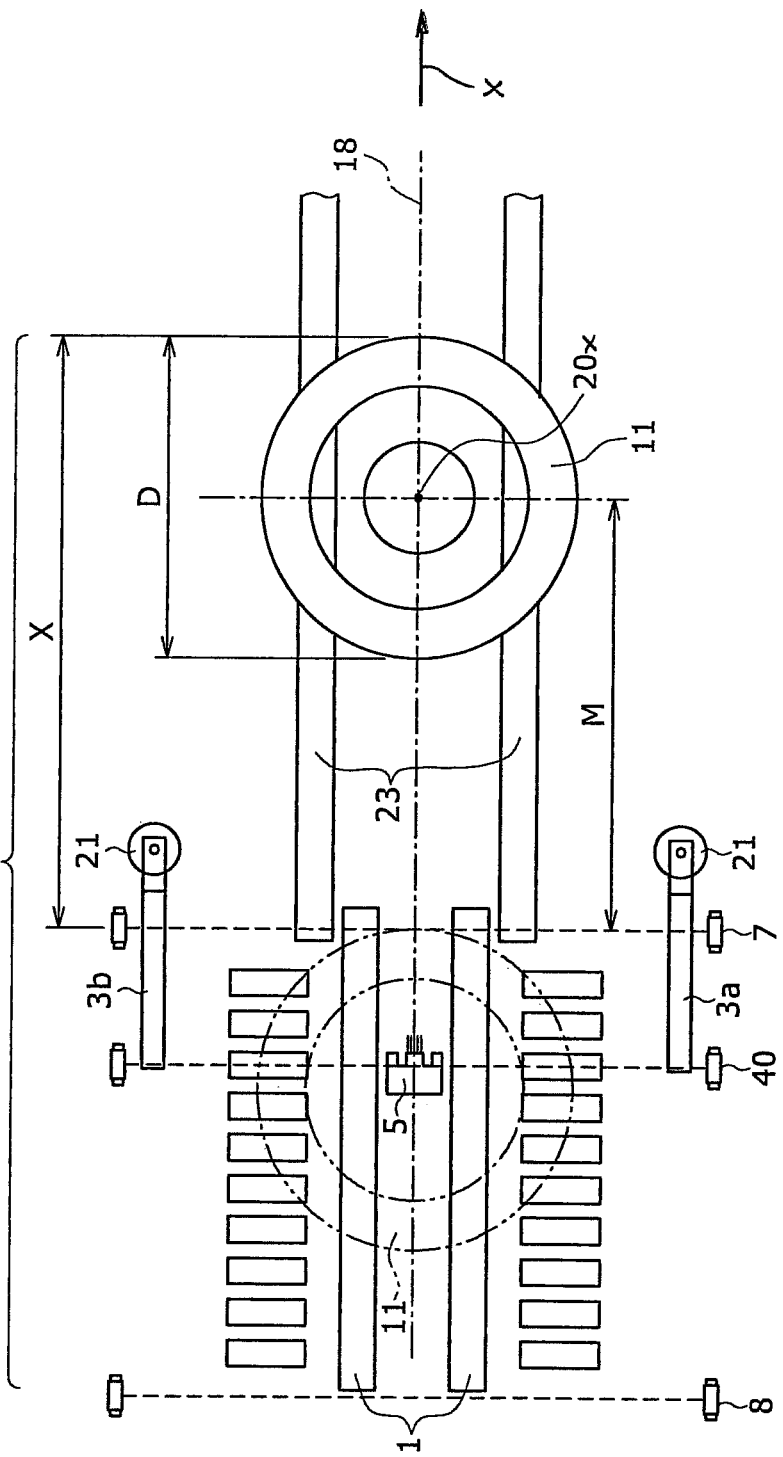
FIG. 9 is a top view of the tire testing machine illustrating a state in which the associated tire has been moved from a starting position (shown in phantom lines at the downstream end of the entrance conveyor) to a testing position.

Subsequently, as illustrated in FIG. 9, the air cylinder 4 is driven so that the pair of arm members 3a and 3b is rotated outward in the width direction so as to be opened to release the tire 11 from the rollers 21. As indicated by the solid line of FIG. 6, the roller elevation mechanism 32 is then operated so that the roller surface 16 is caused to descend in relation to the conveying surface 6 of the entrance conveyor 1 and hence the tire 11 is transferred from the roller surface of the roller portion 16 again onto the conveying surface 6 of the entrance conveyor 1.

With the tire 11 again supported on the conveying surface 6, the entrance conveyor servo motor 2 is actuated to drive the entrance conveyor 1 so that the tire 11 is conveyed again in the downstream direction D1 toward the test station 34.

When the tire 11 is slightly moved toward the test station 34 by the entrance conveyor 1, the lubricator 5 that applies lubricant to the tire 11 becomes spaced from the tire bead 15 and is then caused to descend by the air cylinder 14 so as to be returned to the standby position (FIG. 4) below the conveying surface 6 and below the roller surface 16.

Then, as indicated by the phantom line of FIG. 9, the tire moves on the entrance conveyor 1 in the direction x to the position where the front end 13 of the tire 11 is again detected by the downstream photoelectric sensor 7, and the tire is located in such position. Accordingly, regardless of the diameter of the tire 11, the exact position of the tire 11 on the entrance conveyor 1 is known (such position indicated using phantom lines in FIG. 9), because the arms 3a,3b have centered the tire laterally on the entrance conveyor 1, and the front end 13 of the tire 11 is located at a predetermined position in the conveying direction x according to its detection by the downstream detector 7.

As indicated by the solid line of FIG. 9, the entrance conveyor 1 and the center conveyor 23 are driven in a synchronized state by motors 2, 23a so that the tire 11 is conveyed in the x direction on the x axis to a testing position where its rotational center 17 (the tire's axis of rotation 17) matches or is coincident with the rotational axis 20x defined by the spindle core 20 of the lower spindle 24 of the test station 34. When the tire 11 is so positioned in this testing position, a sequence of the chucking operations using the chucking mechanism 36 are carried out to mount the tire 11 to the upper and lower rim portions R1,R2, to inflate the tire 11, and to test the uniformity of the tire.

Figure 10:
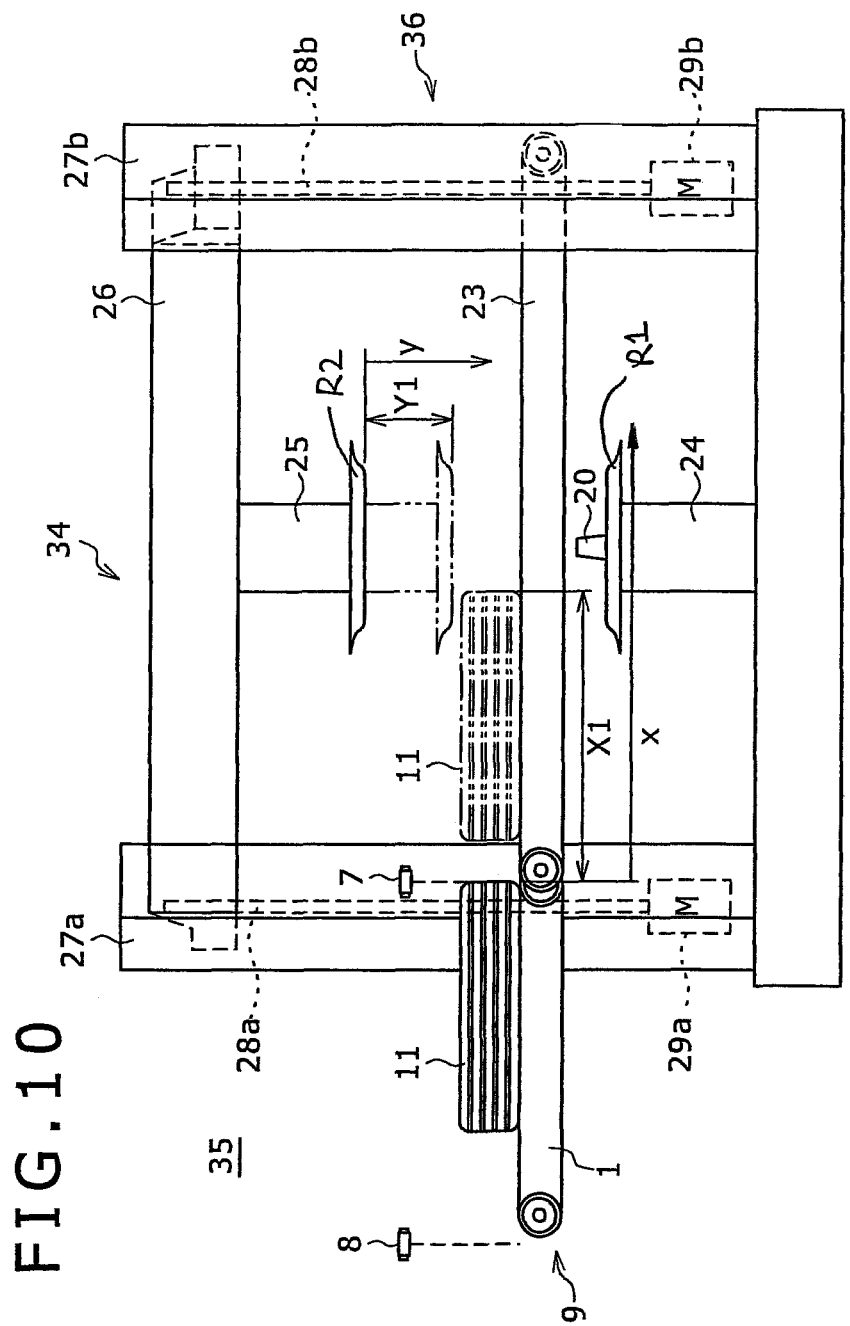
FIG. 10 is a side view of the tire testing machine that illustrates a first intermediate state in which the tire is being moved in the x direction along the x axis toward the testing position while the upper spindle is being moved simultaneously in the y direction along the y axis toward the testing position as illustrated in phantom lines.
Figure 11:
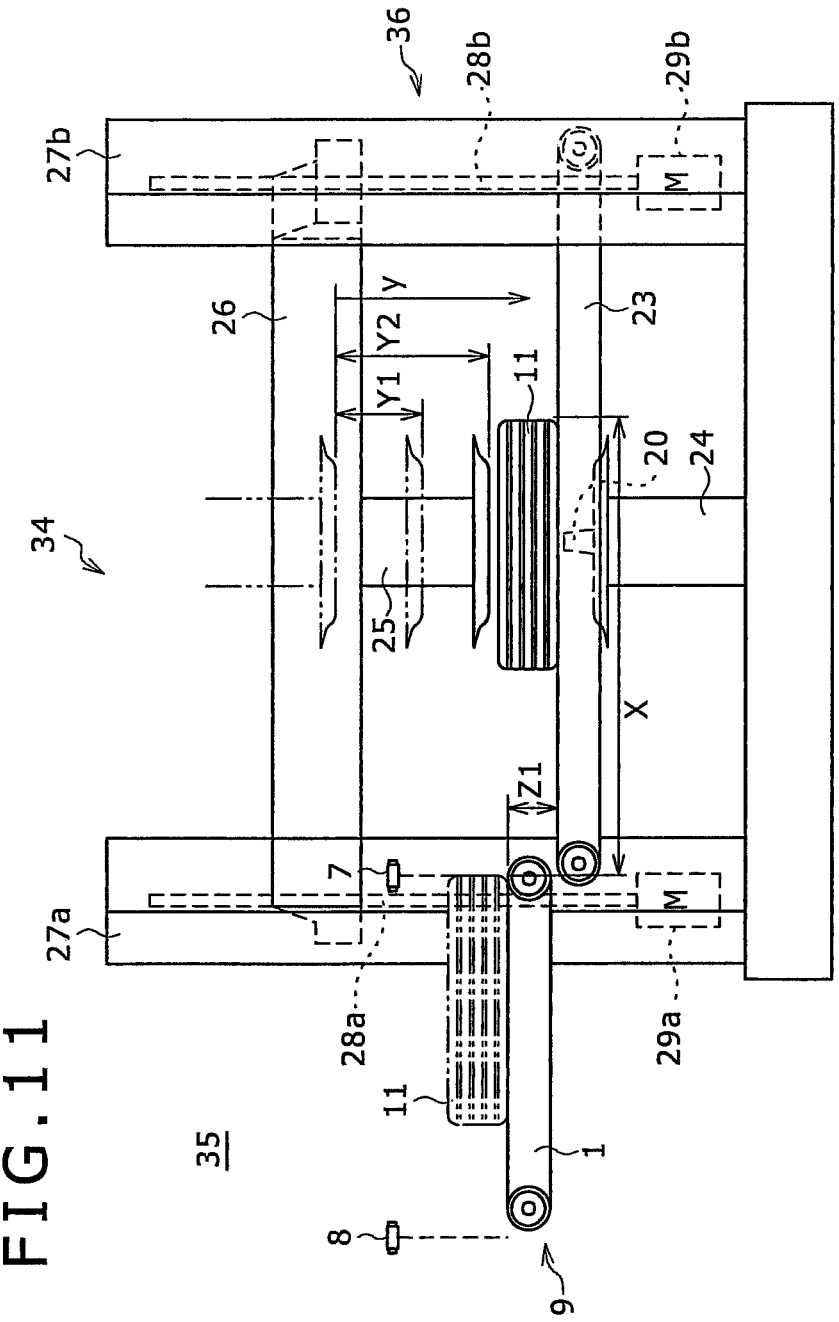
FIG. 11 is another side view that is similar to FIG. 10, but illustrates a second intermediate state in which the associated tire is located along the x axis in the testing position and in which the center or main conveyor has been moved a distance Z1 in the y direction along the y axis to an intermediate lowered position and in which the upper spindle has been lowered further to an intermediate position Y2 on the y axis.

More particularly, the positions of the tire 11, the upper spindle 25, and the center conveyor 23 indicated by the solid line of FIG. 10 are referred to as the "initial position". Here, the conveying direction in which the tire 11 is conveyed along a horizontal axis by the entrance conveyor 1 and the center conveyor 23 is set as the "x direction" or "x axis", the position (the predetermined initial position) of the tire front end 13 in a state where the tire front end 13 is positioned at the entrance conveyor 1 is set as "x=0", and the position of the front end 13 of the tire 11 when the axis of rotation 20x of the spindle core 20 matches the tire axis of rotation 17 is indicated by the solid line of FIG. 11 as position "X" (i.e., x=X) and is referred to as the "final target position" or the "testing position." That is, the conveying distance of the tire 11 from its predetermined initial position until its axis of rotation 17 is coincident with the axis of rotation 20x of the spindle core 20 is a distance "X" as shown in FIG. 11. Further, an intermediate position (also referred to as the "first target position") is defined where x=X1<X where tire axis of rotation 17 is located upstream from the spindle axis of rotation 20x as indicated by the phantom lines in FIG. 10, and this position X1 is used in only certain embodiments. In one example, a desired first target position X1 can be set in advance based on the dimension of the tire 11 or a sensor can be used to so position the tire 11.

Furthermore, the conveying distance X is calculated based on the following equation (5) using the tire outside diameter OD:

$$X = MX + OD/2 \quad (1)$$

where MX is the predetermined or known distance from the position of the downstream photoelectric sensor 7 to the axis of rotation 20x of the spindle core 20 as shown in FIG. 9. Those of ordinary skill in the art will recognize that the position of the tire 11 on the central conveyor 23 along the x axis is always known based upon the x axis position feedback provided by the center conveyor servo motor 23a. Alternatively, position sensors associated with the central conveyor 23 and/or the tire 11, itself, can provide such x axis positional feedback.

Figure 12:
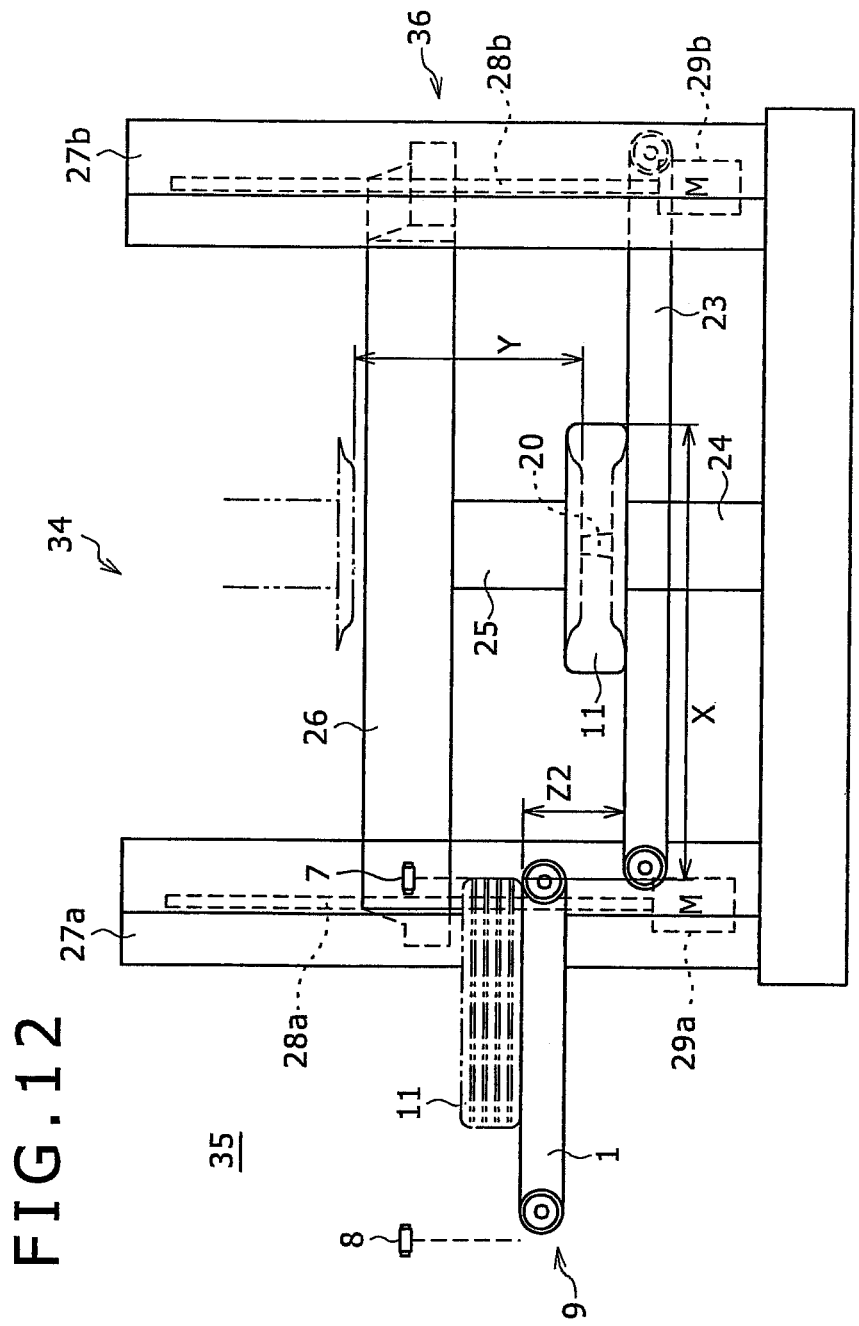
FIG. 12 is a side view that illustrates a testing state in which the position of the center/main conveyor is lowered by a distance Z2 from its starting position such that the while the upper spindle has descended to a final testing position Y and the tire is operatively mounted for testing between the upper and lower rim portions (i.e., the tire is "chucked" for testing, but the conveyor would be lowered further beyond Z2 to separate from the tire to allow testing to take place)

Meanwhile, the vertical axis or descending direction of the upper spindle 25 is referred to herein as the "y direction", and its initial position is set as "y=0", and the final target position or testing position in which the tire 11 is operably interposed between the lower rim portion R1 of the lower spindle 24 and the upper rim portion R2 of the upper spindle 25 is referred to as "Y" (i.e., y=Y) and is indicated by the solid lines of FIG. 12. In the present embodiment, the distance Y represents the total distance that the upper spindle descends from its initial position y=0 to the final target position y=Y. Alternatively, the lower spindle 24 can move toward the upper spindle, in which case the distance Y is the sum of the distances moved by the lower and upper spindles 24,25 to operably mount the tire 11 on the lower and upper rim portions R1,R2. Furthermore, a second target position y=Y1 is defined wherein the upper spindle 25 has descended from its initial position to a position where the upper rim R2 is close to but does not contact the tire 11 as indicated by the dashed line of FIG. 10 (in an alternative embodiment, the upper rim R2 touches the tire and maintains contact therewith as described in full detail below). In one example, the second target position Y1 is set in advance based on the dimension of the tire 11 or a sensor can be used to so position the upper rim R2. Those of ordinary skill in the art will recognize that the position of the upper spindle 25 and upper rim portion R2 thereof are always known based upon the y axis position feedback provided by the first and second upper spindle servo motors 29a,20b. Alternatively, position sensors can be provided and associated with the upper spindle 25 to provide such y axis position feedback.

The servo motors 29a and 29b are driven and so that the upper spindle 25 and the upper rim portion R2 rim moves toward the lower spindle 24 and its lower rim portion R1 according to the following equation (2)

$$y = F(x)(0 \leq x \leq X) \quad (2)$$

where x represents the position of the tire 11 on the x axis or more generally represents the conveying distance moved by the belts or other conveying surface of the center conveyer 23 in the x direction on the x axis while the tire 11 is supported thereon. In one more specific alternative embodiment, the chucking mechanism 36 adjusts the position of the upper spindle 25 in a manner such that the servo motors 29a and 29b are driven and so that the upper spindle 25 descends based on the following equation (3)

$$y = F(x)(0 < x < X1, Y1 = F(X1)) \quad (3)$$

Here, the function F is a function of the tire 11 on the x axis in the conveying direction (the x direction) of the entrance conveyor 1 and the center conveyor 23, and may be appropriately selected based on the state of the chucking mechanism 36. For example, the chucking mechanism 36 controls the driving of the servo motors 29a and 29b so that y moves in proportion to x as in the following equation (4):

$$y = (Y1/X1) \cdot x(0 < x < X1) \quad (4)$$

In this example, the entrance conveyor 1 and the center conveyor 23 convey the tire 11 to the first target position X1 by driving the entrance conveyor servo motor 2 and the center conveyor servo motor 23a. In the meantime, the chucking mechanism 36 causes the upper spindle 25 to descend to the second target position Y1 (that is, the upper spindle 25 approaches the lower spindle 24) by driving the servo motors 29a and 29b based on the above-described equations (3) and (4). Furthermore, a state where the front end 13 of the tire 11 is located at the first target position X1 in the x direction and the upper rim portion R2 of the upper spindle 25 is located at the second target position Y1 in the y direction (the state indicated by the dashed line of FIG. 10) is referred to as a the "first state". When this "first state" is obtained, (where the tire 11 is conveyed to the first target position X1 and upper rim R2 of the upper spindle 25 descends to the second target position Y1 in the y direction), the center conveyor 23 can be caused to begin to descend from its initial or home position where it is vertically aligned with the entrance conveyor (FIG. 10) toward the lower spindle 24 under the action of the elevation mechanism 23c. From the first state, the tire 11 is also further conveyed in the x direction to its "final target position" or "testing position" and the upper spindle 25 is caused to descend in a simultaneous and synchronous manner further toward the lower spindle 24 as a function of the position of the tire 11 on the x axis as described below. In an alternative case where the center conveyor elevation mechanism 23c does not provide position feedback, it is preferred that the center conveyor 23 remain in its initial or home (fully raised) position until the tire 11 is located completely or at least substantially in its final target position X (e.g., at least until the axis of rotation 20x of the testing machine 35 is contained within the open inside diameter of the tire 11) to ensure that the tire 11 does not contact the lower spindle 24 or any other part of the tire testing machine 35 that would interfere with the desired movement of the tire 11 in the x or y directions as the center conveyor 23 is being lowered. When the center conveyor elevation mechanism 23c is provided by a servo actuator or when other sensors are used to determine the vertical position of the center conveyor 23, the center conveyor 23 can begin to descend as soon as the tire 11 is clear of the entrance conveyor 1 provided that the center conveyor is lowered in a manner where the tire 11 will not contact the lower spindle 24 or any other interfering component that will dislodge the tire 11 from its known position on the center conveyor 23.

When the tire 11 reaches its final target position X in the x direction, the driving of the center conveyor servo motor 23a is stopped, so that the center conveyor 23 is stopped and the position of the tire 11 on the x axis is fixed. Then, at this time point, the upper rim portion R2 of the upper spindle 25 is located at a third target position Y2 in the y direction as shown in FIG. 11. Further, the center conveyor 23 at this time point is located at an elevation (in the y direction) above its final target position Y in the y direction so that the tire 11 does not yet contact the lower rim portion R1 of the lower spindle 24. Specifically, the position of the center conveyor 23 in the y direction is lower than the initial position by a distance Z1 (FIG. 11). This state where the front end 13 of the tire 11 is located at the final target position X in the x direction, the upper rim R2 of the upper spindle 25 is located at the third target position Y2 in the y direction, and the position of the center conveyor 23 in the y direction is lower than its initial position by a distance Z1 (a state indicated by the solid lines of FIG. 11) is referred to as a "second state".

The chucking mechanism 36 causes the upper spindle 25 to descend in the above-described manner as controlled by the servo motors 29a and 29b based on the following equation (4) from the "first state" to the "second state".

$$y = H(x) \quad (5)$$

(X1<x<X, Y1=H(X1), Y2=H(X), and H is an arbitrary function that can vary) The function H is appropriately selected by the characteristics of the chucking mechanism 36. For example, the chucking mechanism 36 may be set so that x−X1 and y−Y1 have a proportional relation as in the following equation (6):

$$y - Y1 = \{(Y2 - Y1)/(X - X1)\} \cdot (x - X1) \quad (6)$$

As such, in the above example which is not intended to be limiting in any way, the position of the tire on the x axis beyond the X1 position, and the position of the upper spindle 25/upper rim R2 on the y axis beyond the Y1 position are controlled to maintain the above-described proportional relationship until the tire 11 reaches its target/testing position X. Further, the descending of the center conveyor 23 is continued and the descending of the upper spindle 25 is also continued even after the center conveyor 23 has stopped conveying the tire 11 in the x direction because the tire 11 has reached the testing position X. The descent of the center conveyor 23 and upper chuck 25 continues and the center conveyor 23 reaches a position on the y axis where it is lower than its initial or home position by a distance Z2 where the lower rim member R1 engages the lower bead 15a of the tire 11, and the upper spindle 25 is also lowered until the upper rim portion R2 engages the upper bead 15b of the tire 11 so that the tire is chucked for testing. Accordingly, the upper rim R2 of the upper spindle 25 is located at the final target position Y in the y direction, and the upper bead 15b of the tire is engaged with the upper rim R2 as shown in FIG. 12. With the above-described sequence, the tire 11 is interposed between the lower rim R1 of the lower spindle 24 and the upper rim R2 of the upper spindle 25, thereby completing the conveying of the tire 11 to the final target or testing position in both the x and y directions. The conveyor 23 is lowered further beyond the Z2 position a minimal amount required to separate the tire from the conveyor 23 to allow for rotational uniformity testing.

Those of ordinary skill in the art will recognize that a tire testing machine 35 according to the present development provides for faster cycle times because the vertical position of the upper spindle 25 (upper rim R2) on the y axis is controlled as a function of the horizontal position of the associated tire 11 on the x axis, and the upper spindle 25 and upper rim portion R2 are moved vertically on the y axis simultaneously with and as a function of movement of the tire 11 on the x axis in a synchronized manner. The present development also provides for smoother operation because the upper spindle 25 need not be moved with excessive acceleration and speed as in prior system where the upper spindle 25 is moved toward the tire 11 only after the tire has reached it's the target/testing position on the x axis. Further, the present development makes it possible to decrease the size of the motors and for moving the upper spindle 25.

Figure 13:
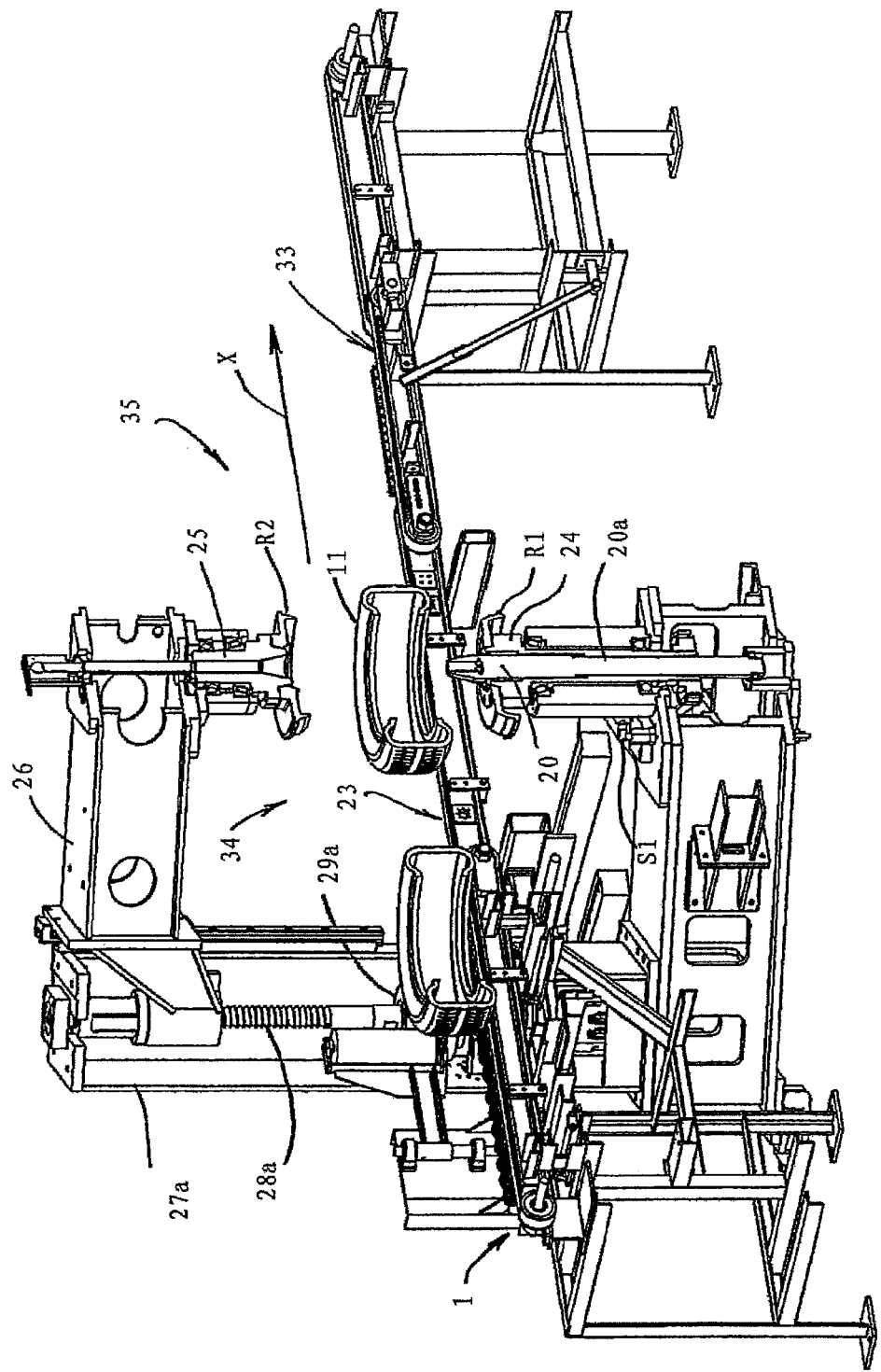
FIG. 13 provides an isometric section view of a tire testing machine provided in accordance with the present development and shows a state where the tire being tested is located in the testing position X along the X axis but the center conveyor is still in its home or elevated position vertically aligned with the entrance conveyor and exit conveyor.

FIG. 13 provides an isometric section view of a tire testing machine 35 provided in accordance with the present development. There, it can be seen that the lower spindle 24 comprises a spindle plunger or core 20 that moves upward to a raised position by any suitable cylinder or other core actuator 20a. The vertical (y axis) position of the core 20 is detected by a core position sensor S1. Alternatively, a servo motor or other servo actuator is used to move the position of the core 20, in which case the separate sensor S1 is not needed as the servo device provides feedback that identifies the vertical position of the core 20.

Figure 14:
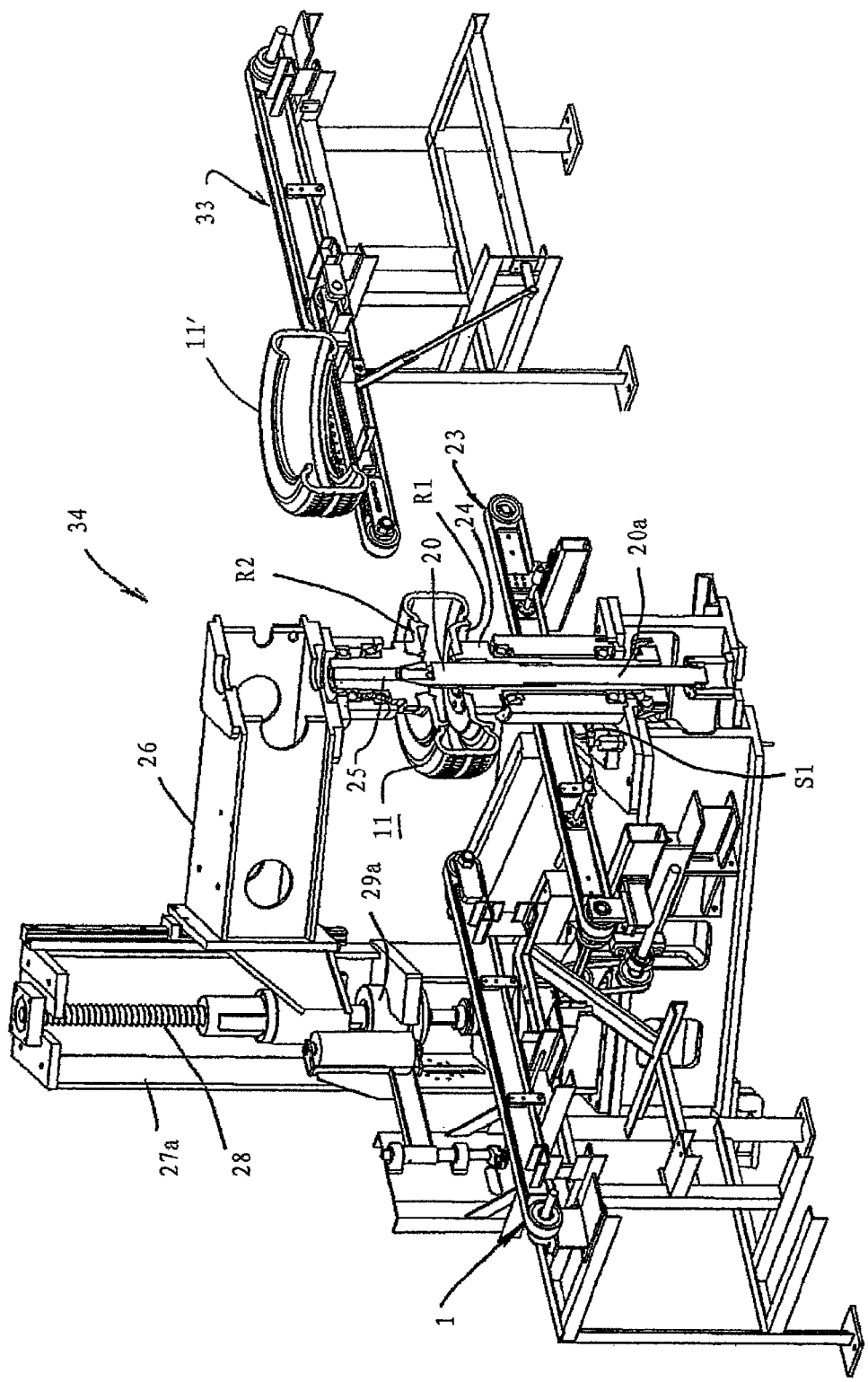
FIG. 14 is similar to FIG. 13 but shows the tire testing machine in a state where the tire being tested is operatively mounted to the lower and upper rim portions for testing operations.

Referring now also to FIG. 14, after a tire 11 is located in its final target or testing position on the x axis, the core 20 is extended vertically through the inner diameter of the tire toward the upper spindle 25. When the upper spindle 25 descends sufficiently in the y direction, the upper spindle 25 contacts and physically mates with the core 20 as the upper spindle 25 descends along the y axis, and the core 20 is then pushed downward along the y axis by the upper spindle 25. The core 20 thus temporarily mechanically connects the lower spindle 24 and upper spindle 25 so the position of the upper spindle 25 relative to the lower spindle 24 is also known by the output of the core position sensor S1. The core position sensor S1 provides output that indicates the exact vertical position of the core 20 and, thus, the exact vertical position of the upper rim half R2 on the y axis relative to the lower rim half R1. In this manner the core position sensor S1 indicates the spacing between the upper rim half R2 and the lower rim half R1 which can then be precisely controlled via motors 29a,29b as required for the lower and upper rim halves R1,R2 to mount or "chuck" the tire 11 for testing purposes based upon the tire width (the width of the tire 11 being tested is known and has previously been input from any suitable means that detects, reads, or otherwise derives or provides the tire width). The sensor S1 can be eliminated and the position feedback provided by the upper spindle motors 29a,29b used to determine and control the spacing between the lower and upper rim portions R1,R2.

Figure 15:
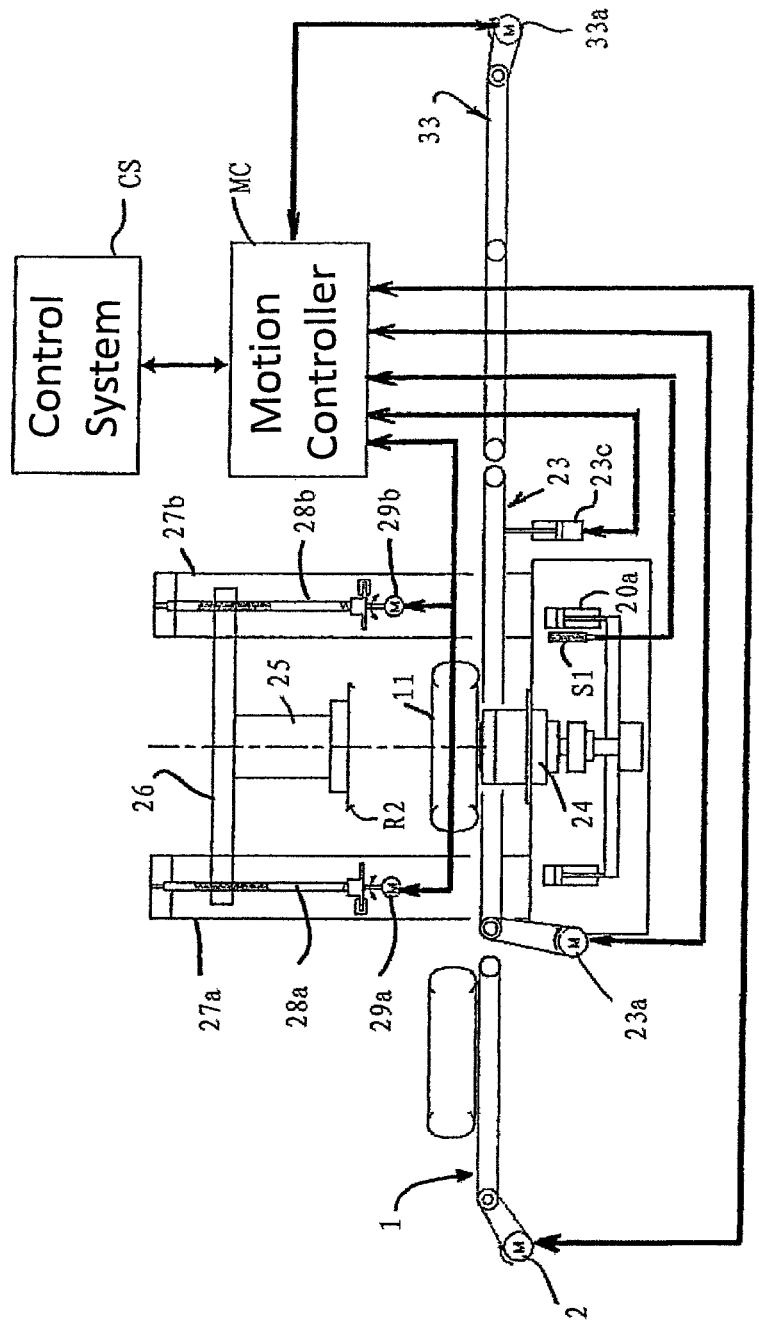
FIG. 15 is a diagrammatic view of a tire testing machine provided in accordance with the present development and showing a control system thereof.

As shown in FIG. 15, the entrance conveyor motor 2, the center conveyor motor 23a,the upper spindle motors 29a, 29b,the core position sensor S1, and preferably also the center conveyor elevation actuator(s) 23c are all controlled by and provide position feedback to an industrial automation control system comprising a programmable logic controller (PLC) or other controller and preferably also comprising a dedicated multi-axis motion controller MC or more than one of same for controlling the servo actuators/motors 2,23a, 29a,29b,23c,33a. The motion controller MC can be provided as part of the PLC or other control system and/or as one or more dedicated motion controller separated from but operably connected to the control system. As used herein, the term "motion controller" or "motion control system" is intended to encompass a single motion controller or multiple separate motion controllers that are directly or indirectly operably connected with each other.

With the above in mind, an example of a testing cycle is disclosed which, again, is not intended to be limiting, and other testing cycles can be performed without departing from the scope and intent of the present development. At the start of a testing cycle, the center conveyor 23 is in its fully raised or up position as controlled by the actuator(s) 23c. A tire 11 to be tested is supported on the entrance conveyor and is the next tire to be tested. As described herein, according to the present development, downward motion of the upper spindle 25 (via slide beam 26 in the illustrated embodiment) occurs via servo motor(s) 29a,29b in a simultaneous and coordinated synchronous manner with operation of the entrance conveyor 1 along the x axis via servo motor 2, and operation of the center conveyor 23 along the x axis via servo motor 23a, with all the actuators 29a,29b; 2; 23a; controlled by and providing position feedback to the motion controller MC. The vertical motion of the upper spindle 25 downward toward the center conveyor 23 along the y axis is controlled as a function y=F(x) where x represents of the position of the tire 11 to be tested along the x axis in the testing station 34 (or x can more generally be deemed to represent the position of the conveying belt(s) of the center conveyor 23). The position of the tire 11 on the x axis is known based upon the starting position of the tire 11 when it is located on the entrance conveyor 1 and by the feedback output provided by the entrance conveyor servo actuator 2 and/or by the center conveyor servo actuator 23a. The initial or starting position of the tire 11 to be tested along the x axis on the entrance conveyor and/or center conveyor is known and/or controlled by mechanical positioning means of the entrance conveyor 1 and/or as determined by the sensors 7,8,40 or by machine vision and/or the like. The position of a previously tested tire along the x axis is also known based upon feedback output provided to the motion controller MC by the center conveyor servo motor 23a and by an exit conveyor servo motor 33a of an exit conveyor 33. The exit conveyor is located adjacent and downstream from the center conveyor 23 and receives the tested tire from the center conveyor 23. The starting position (i.e., x=X) of the tested tire along the x axis upon completion of a test is also known. The exit conveyor servo motor 33a is also operably connected to and controlled by and provides x axis feedback to the motion controller MC as shown in FIG. 15.

Thus, according to the present development, the upper spindle 25 and its upper rim half R2 connected thereto begin moving downward along the y axis toward the center conveyor 23 and lower spindle 24/lower rim half R1 while the next tire to be tested 11 is being conveyed in the x direction along the x axis but before the next tire to be tested 11 reaches the testing position X, and while the previously tested tire is being conveyed along the x axis away from the testing position X toward the exit conveyor 33 but before the previously tested tire has exited the center conveyor 23. According to the above, the position of the upper spindle 25 along the y axis is dependent on the position of the center conveyor along the x axis according to y=F(x), where "y" is the position of the slide beam 26 along the y axis and "x" represents the position of the center conveyor on which the tire 11 to be tested is supported and the position of the associated tire 11 to be tested along the x axis.

When a tire 11 to be tested has reached the test position X on the x axis as determined by feedback to the motion controller MC from the center conveyor servo motor(s) 23a,the center conveyor 23 begins to move downward along the y axis as controlled by the cylinder or other center conveyor elevation actuator 23c. As described herein, the center conveyor elevation actuator 23c can also be provided as a servo motor/actuator controlled by the motion controller MC and that also provides position feedback to the motion controller MC for coordinated motion with the servo actuators 2,23a,29a,29b,33a,in which case the center conveyor 23 can begin to move downward along the y axis after the previously tested tire has exited the center conveyor onto the exit conveyor 33 and after the tire to be tested 11 has arrived on the center conveyor 23 from the entrance conveyor 1, and such movement of the center conveyor on the y axis toward the lower spindle 24 is controlled to ensure that the tire 11 will not contact the lower spindle 24 or any other components that would interfere with its movement along the x axis or y axis. In the illustrated embodiment, the core (FIG. 13) moves upward along the y axis relative to the lower rim half R1 to its raised position by the cylinder or other actuator 20a. The vertical (y axis) position of the core 20 is detected by the sensor S1 that provides output to the motion controller MC. In an alternative embodiment, the sensor S1 is eliminated because once the upper spindle 25 contacts and mates with the core 20, the position of the core 20 is known as a function of the position of the upper spindle 25 as provided by position feedback from the upper spindle servo actuator(s) 29a,29b. In still another embodiment, a servo motor or other servo actuator is used for the core actuator 20a to move the position of the core 20 along the y axis as controlled by the motion controller MC, in which case the separate sensor S1 is not needed as such a servo device provides direct position feedback to the motion controller MC.

As shown in FIG. 14 and described above, with the tire to be tested 11 located in the testing position X, the core 20 is moved to its fully raised position, and the upper spindle 25 continues to descend toward the tire 11 as controlled by the servo motors 29a,29b, and the tire to be tested 11 is supported on the lower rim half R1 of the lower spindle 24 due to the descent of the center conveyor 23. Upon further movement of the upper spindle 25 toward the lower spindle 24, the upper spindle 25 contacts and physically mates with the core 20 as the upper spindle 25 moves toward the lower spindle 24 along the y axis, and the core 20 is pushed by the upper spindle 25 downward along the y axis as movement of the upper spindle 25 toward the lower spindle 24 continues.

With continuing reference to FIG. 14, the upper spindle 25 and its upper rim half R2 are stopped at a select vertical position along the y axis as controlled by the motion controller MC so that the tire 11 is operatively mounted between the lower and upper rim halves R1,R2 according to the tire width. The tire is inflated for testing. At this stage the entrance conveyor 1 and exit conveyor 33 continue to be controlled by the motion controller MC in a coordinated fashion using the servo motors 2 and 33a,respectively, to feed a next tire to be tested (not shown) toward the center conveyor 23 and to remove the previously tested tire 11' away from the center conveyor 23.

As noted, in an embodiment in which the center conveyor vertical actuator 23c comprises a servo actuator operatively connected to the motion controller MC, once the tire is located in the testing position X along the x axis so that it is no longer moving in the x direction, the movement of the upper spindle 25 along the y axis by the upper chuck motor(s) 29a,29b is optionally coordinated by the motion controller MC with the downward movement of the center conveyor along the y axis away so that the upper rim half R2 is in continuous light contact with the tire 11 at least as it is lowered onto the lower rim half R1. This contact between the upper rim half R2 and the tire 11 as the tire 11 contacts and seats on the lower rim half R1 will help to ensure that the tire 11 being tested does not undesirably tilt off of the horizontal axis x as it is lowered onto the lower rim half R1 which can lead to a "mischuck" that can slow or terminate testing and/or damage the tire 11.

FIG. 14 shows the tire 11 as it is being tested. The tire uniformity machine TUM includes a load wheel, load measurement cells and other tire uniformity testing equipment (not shown) for rotating and testing the tire 11. The tire 11 is rotated while in contact with the load wheel such that the loads measured by the load cells indicate the physical characteristics of the tire. The tire uniformity machine 35 may also include devices for grinding and/or otherwise processing the tire to correct certain defects and/or for marking and classifying the tire 11.

Once testing of the tire 11 has been completed, the tire 11 is deflated and the upper spindle 25 is moved upward (away from the lower spindle 24) along the y axis to de-chuck the tire 11 while the center conveyor simultaneously moves upward as controlled by the actuator 23c. The core 20 is lowered/retracted using the core actuator 20a. In one embodiment, the upper spindle 25 moves to its maximum or fully raised position on the y axis. In an alternative embodiment, the upper spindle moves upward along the y axis away from the lower spindle as controlled by the motion controller MC and the center conveyor servo motor 23a is activated to move the just-tested tire 11 downstream in the conveying direction x as soon as the upper rim portion R2 is separated from the tire 11 by a minimum clearance distance sufficient for the tire 11 to move downstream and also while the center conveyor 23 is simultaneously being moved upward toward its home position by the center conveyor vertical actuator 23c. In such case, the motion controller MC operates the spindle actuators 29a,29b to reverse the movement of the upper spindle 25 before it reaches a full-up position so that it again moves toward the lower spindle 24 when the next tire to be tested is located on the center conveyor 23 and is moving in the x direction toward the testing position to provide a coordinated exit of the just tested tire 11 and entrance of the next tire to be tested.

While the preferred embodiment of the present invention has been described, the present invention is not limited to the above-described embodiment, and may be modified into various forms within the scope of claims.

In one embodiment, the slide beam 26 and upper chuck 25 always move to the maximum or fully raised position on the y axis between tire tests. In an alternative embodiment, the beam 26 and upper chuck 25 only move upward on the y axis as controlled by the motion controller a minimum amount required to separate the upper rim R2 from the tire 11 and to provide sufficient vertical clearance for entrance of the next tire to be tested into the testing position.

In accordance with one alternative embodiment, the upper rim R2 of the upper chuck 25 contacts the tire 11 to be tested after the tire 11 has reached its target testing position on the x axis and while the center conveyor 23 is descending and the upper rim R2 maintains such contact with the tire until the tire is fully "chucked" (mounted on the lower and upper rims R1,R2). In this manner, the tire is maintained in its horizontal orientation as it seats on the lower rim which minimizes the likelihood of the tire being "mischucked" (i.e., mounted improperly on the lower and/or upper rims R1,R2). In such case, the third target position y=Y2 is defined so that the upper spindle 25 has descended from its initial position y=0 to a position where the upper rim R2 minimally contacts the tire 11.

While the illustrated embodiment includes first and second servo motors 29a,29b for moving the upper spindle 25 on the y axis, a single servo motor 29a or 29b or other servo actuator can be used to move the upper chuck 25 vertically on the y axis. For example, one or more pneumatic or hydraulic cylinders including an associated position sensor can be used in place of the servo motors 29a,29b to move the upper spindle 25 on the y axis. Also, the slide beam 26 can be fixed in position on the y axis, and the upper spindle 25 can be movable relative to the slide beam 26 on the y axis as controlled by a servo actuator or other actuator, provided such other actuator or associated sensors provide the required feedback concerning the vertical position of the upper spindle 25 on the y axis.

In the tire testing machine 35 according to the above-described embodiment, a control is performed so that the upper spindle 25 moves toward or away from the lower spindle 24 in a manner such that the chucking mechanism 36 moves only the upper spindle 25. However, system may be provided in which both the lower spindle 24 and the upper spindle 25 move close to or away from each other as controlled by respective servo motors or other actuators in a manner such that the chucking mechanism changes the position of both the lower spindle 24 and the upper spindle 25 on the y axis, or only the lower spindle 24 can be controlled to move toward and away from the upper spindle 25 under control of a servo actuator or other actuator.

In the tire testing machine 35 according to the above-described embodiment, the sensors that detect the front end 13 and the rear end 12 of the tire 11 on the entrance conveyor 1 are configured as the non-contact photoelectric sensors 7, 8, 40 but these sensors may alternatively be configured as the other non-contact sensors or contact sensors.

In the tire testing machine 35 according to the above-described embodiment, the tire testing machine conveyor 9 that sends the tire 11 to the test station 34 is configured as a belt conveyor, and the entrance conveyor 1 and the center conveyor 23 are divided as two conveyors. However, the conveyor may be configured as one continuous belt conveyor (i.e., the entrance conveyor 1 can be combined with the center conveyor 23 as a single conveyor) or the entrance conveyor 1, center conveyor 23, or both can alternatively be configured as a conveyor other than a belt conveyor.

In the tire testing machine 35 according to the above-described embodiment, the roller surface 16 includes the unit roller provided in the placement roller 16a so that the rotation shaft thereof is perpendicular to the rotation shaft of the placement roller, but a free roller having a different structure may be used as long as the tire is placed on the roller portion in a rotatable state.

In the tire testing machine 35 according to the above-described embodiment, the tire 11 is sent in a horizontal state by the tire testing machine conveyor 9 to the tire testing machine 35 in which the tire is tested in a horizontal state, but the tire may be sent in a vertical state by the tire testing machine conveyor 9 to the tire testing machine in which the tire is tested in a vertical state.

In the tire testing machine 35 according to the above-described embodiment, the belt conveyor servo motor 2 and the belt conveyor servo motor 23a are used as the devices that drive the entrance conveyor 1 and the center conveyor 23 as the tire testing machine conveyor 9, but the present invention is not limited thereto. For example, the other driving devices may be used provided that the position of the associated tire 11 on the x axis is known from contact or non-contact position sensors that directly detect the position of the tire and/or that detect the position of the entrance conveyor 1 and/or center conveyor 23.

Other modifications and alterations will occur to those of ordinary skill in the art to which the present development pertains upon reading and understanding this specification. It is intended that the claims be construed as encompassing all such modifications and alterations to the maximum possible consistent with maintaining the validity of the claims.

The invention claimed is:

1. A tire testing machine comprising:
an upper spindle comprising an upper rim portion;
a lower spindle comprising a lower rim portion;
a spindle actuator adapted to vary a distance between the upper and lower spindles along a y axis;
a conveyor adapted to move an associated tire to be tested along an x axis, said conveyor driven by a conveyor actuator;
a motion controller that receives x axis position feedback indicating a conveying distance moved by said conveyor in a conveying direction along said x axis from an initial position where x=0 to a testing position where x=X and that uses said x axis position feedback to control said spindle actuator simultaneously with and during movement of the conveyor in said conveying direction along said x axis to reduce said distance between the upper and lower spindles along said y axis while the conveyor is moving in said conveying direction according to a function y=F(x) where $0 \leq x \leq X$ such that said motion controller provides coordinated synchronous reduction of said distance between the upper and lower spindles along said y axis in response to and simultaneously with movement of said conveyor in said conveying direction along said x axis.

2. The tire testing machine as set forth in claim 1, wherein said upper spindle is connected to a slide beam, and said slide beam is movably connected to a frame, said spindle actuator comprising first and second spindle motors respectively operably engaged with said slide beam and adapted to move said slide beam along said y axis.

3. The tire testing machine as set forth in claim 2, further comprising first and second screw jacks respectively engaged between said first and second spindle motors and said slide beam to move said slide beam along said y axis in response to rotation of said first and second spindle motors.

4. The tire testing machine as set forth in claim 3, wherein said conveyor actuator and said first and second spindle motors comprise respective servo motors, and wherein said conveyor actuator servo motor provides said x axis position feedback to said motion controller and said first and second spindle servo motors provide y axis position feedback to said motion controller indicating a position of said upper spindle along said y axis, wherein said motion controller controls said conveyor actuator servo motor and said first and second spindle servo motors according to said function y=F(x) for simultaneous coordinated synchronous movement of said upper spindle along said y axis and said conveyor along said x axis.

5. The tire testing machine as set forth in claim 1, wherein said conveyor actuator and said spindle actuator comprise respective servo motors, and wherein said conveyor actuator servo motor provides said x axis position feedback to said motion controller and said spindle servo motor provides y axis position feedback to said motion controller that indicates a position of said upper and lower spindles relative to each other on said y axis, wherein said motion controller controls said conveyor actuator servo motor and said spindle actuator servo motor according to said function y=F(x) for simultaneous coordinated synchronous variation of said distance between the upper and lower spindles along said y axis and said conveyor along said x axis.

6. The tire testing machine as set forth in claim 1, further comprising a core that is selectively extensible from the lower spindle and that selectively contacts and mates with the upper spindle when the upper spindles moves toward the lower spindle on said y axis.

7. The tire testing machine as set forth in claim 6, wherein said upper spindle moves said core toward said lower spindle during movement of said upper spindle toward said lower spindle along said y axis.

8. The tire testing machine as set forth in claim 7, wherein further comprising a core position sensor that senses a position of said core along said y axis and that provides said sensed core position as input to said motion controller to indicate a position of said upper spindle relative to said lower spindle.

9. The tire testing machine as set forth in claim 1, wherein said conveyor moves up and down along said y axis, said tire testing machine further comprising a conveyor elevation actuator operatively engaged with said conveyor that moves said conveyor up and down along said y axis.

10. The tire testing machine as set forth in claim 9, wherein said conveyor elevation actuator comprises a conveyor elevation servo actuator operably connected to said motion controller and that is controlled by and provides conveyor elevation feedback to said motion controller that indicates said elevational position of said conveyor along said y axis.

11. The tire testing machine as set forth in claim 10, wherein said motion controller controls said conveyor elevation servo actuator to change said elevational position of said conveyor along said y axis as a function of said x axis position feedback and said y axis position feedback provided to said motion controller.

12. The tire testing machine as set forth in claim 1, wherein said lower and upper spindles define an axis of rotation, and wherein said motion controller controls said spindle actuator to vary said distance between said upper and lower spindles along said y axis according to said function y=F(x) simultaneously with movement of the associated tire on said conveyor in said conveying direction toward said axis of rotation when said x axis position feedback indicates that the associated tire is located upstream from and moving in said conveying direction toward said axis of rotation.

13. The tire testing machine as set forth in claim 4, wherein said conveyor moves up and down along said y axis, said tire testing machine further comprising a conveyor elevation actuator operatively engaged with said conveyor that moves said conveyor up and down along said y axis.

14. The tire testing machine as set forth in claim 13, wherein said conveyor elevation actuator comprises a conveyor elevation servo actuator operably connected to said motion controller and that is controlled by and provides conveyor elevation feedback to said motion controller that indicates said elevational position of said conveyor along said y axis.

15. The tire testing machine as set forth in claim 14, wherein said motion controller controls said conveyor elevation servo actuator to change said elevational position of said conveyor along said y axis as a function of said x axis position feedback and said y axis position feedback provided to said motion controller.

16. The tire testing machine as set forth in claim 15, wherein said lower and upper spindles define an axis of rotation, and wherein said motion controller controls said spindle actuator to move said upper spindle along said y axis toward the lower spindle according to said function y=F(x) simultaneously with movement of the associated tire on said conveyor in said conveying direction toward said axis of rotation when said x axis position feedback indicates that the associated tire is located upstream from and moving in said conveying direction toward said axis of rotation.

17. The tire testing machine as set forth in claim 1, wherein said conveyor comprises an entrance conveyor and a center conveyer located adjacent each other, wherein said center conveyor is adapted to receive an associated tire to be tested from said entrance conveyor and convey the associated tire on said x axis in said conveying direction toward said lower and upper spindles, wherein said conveyor actuator comprises an entrance conveyor servo actuator operably engaged with said entrance conveyor and a center conveyor servo actuator operably engaged with said center conveyor, wherein at least said center conveyor servo actuator provides said x axis position feedback to said motion controller.

18. A method of testing tire uniformity, said method comprising:
  moving a tire to be tested on a conveyor in a conveying direction along an x axis toward a testing position defined between first and second spindles spaced apart by a distance y;
  while said tire is moving along said x axis in said conveying direction on said conveyor toward said testing position, simultaneously moving said second spindle toward said first spindle according to a function y=F(x) where "x" indicates a varying position of said tire to be tested along said x axis as said tire moves toward said testing position such that said second spindle moves in a synchronous and coordinated manner toward said first spindle while said tire to be tested moves in said conveying direction toward said testing position such that said distance y between said first and second spindles is reduced dependent upon said varying position x of said tire to be tested along said x axis.

* * * * *